(12) United States Patent
Mondal et al.

(10) Patent No.: US 9,596,228 B2
(45) Date of Patent: Mar. 14, 2017

(54) METHODS AND SYSTEMS FOR HANDLING TRUSTED CONTENT FROM VARIOUS SERVICE PROVIDERS

(71) Applicant: XEROX CORPORATION, Norwalk, CT (US)

(72) Inventors: Anirban Mondal, Bangalore (IN); Kuldeep Yadav, Gurgaon (IN); Atul Singh, Bangalore (IN); Koustuv Dasgupta, Bangalore (IN); Nischal Murthy Piratla, Fremont, CA (US)

(73) Assignee: Xerox Corporation, Norwalk, CT (US)

( * ) Notice: Subject to any disclaimer, the term of this patent is extended or adjusted under 35 U.S.C. 154(b) by 25 days.

(21) Appl. No.: 14/665,028

(22) Filed: Mar. 23, 2015

(65) Prior Publication Data
US 2016/0285862 A1    Sep. 29, 2016

(51) Int. Cl.
| | |
|---|---|
| *H04L 29/06* | (2006.01) |
| *G06F 17/24* | (2006.01) |
| *G06F 17/30* | (2006.01) |
| *G06F 21/62* | (2013.01) |
| *G06Q 20/14* | (2012.01) |
| *G06Q 40/02* | (2012.01) |
| *G06Q 20/02* | (2012.01) |
| *G06Q 20/32* | (2012.01) |

(52) U.S. Cl.
CPC ........ *H04L 63/0823* (2013.01); *G06F 17/248* (2013.01); *G06F 17/30011* (2013.01); *G06F 17/30595* (2013.01); *G06F 17/30864* (2013.01); *G06F 21/6245* (2013.01); *G06Q 20/027* (2013.01); *G06Q 20/14* (2013.01); *G06Q 20/3221* (2013.01); *G06Q 40/02* (2013.01)

(58) Field of Classification Search
CPC ............... H04L 63/0823; G06F 17/248; G06F 17/30011; G06F 17/30595; G06F 17/30864; G06F 21/6245; G06Q 20/14; G06Q 40/02; G06Q 20/3221
See application file for complete search history.

(56) References Cited

U.S. PATENT DOCUMENTS

| 5,832,460 A | 11/1998 | Bednar et al. |
| 6,289,322 B1 * | 9/2001 | Kitchen ................. G06Q 20/04 705/34 |

(Continued)

*Primary Examiner* — Catherine Thiaw
(74) *Attorney, Agent, or Firm* — Jones Robb PLLC (57) ABSTRACT

A method including authenticating one or more service providers that provide one or more services to users, the one or more service providers being authenticated for sending content to the users via a document banking system. The method further includes receiving one or more templates from the one or more service providers. The method furthermore includes receiving content from a service provider corresponding to a service used by a user, the content is received via secure Application Program Interfaces (APIs). The method includes determining whether the service provider is an authenticated service provider and based on the determination, the method includes identifying a template corresponding to the service for which the content is received. Additionally, the method includes overlaying the received content over the identified template and adding the generated document or the updated document to the document bank account of the user.

23 Claims, 8 Drawing Sheets

(56) References Cited

U.S. PATENT DOCUMENTS

| | | | |
|---|---|---|---|
| 7,805,365 B1* | 9/2010 | Slavin | G06Q 20/10 705/39 |
| 2002/0038340 A1* | 3/2002 | Whipple | G06F 9/465 709/203 |
| 2003/0036999 A1 | 2/2003 | Mirlas et al. | |
| 2003/0182234 A1* | 9/2003 | Degroot | G06Q 30/04 705/51 |
| 2004/0117305 A1* | 6/2004 | Meier | G06Q 20/00 705/40 |
| 2007/0089053 A1* | 4/2007 | Uhlig | G06F 17/212 715/255 |
| 2008/0040265 A1* | 2/2008 | Rackley, III | G06Q 20/02 705/40 |
| 2011/0078245 A1* | 3/2011 | Kiffer | G06Q 20/3278 709/204 |
| 2013/0144785 A1* | 6/2013 | Karpenko | G06Q 20/409 705/44 |
| 2013/0159021 A1* | 6/2013 | Felsher | G06F 19/322 705/3 |
| 2015/0052047 A1 | 2/2015 | Piratla et al. | |
| 2015/0178708 A1* | 6/2015 | Reutov | G06Q 20/405 705/44 |
| 2015/0220649 A1* | 8/2015 | Papa | G06F 17/30867 707/722 |
| 2016/0062972 A1* | 3/2016 | Ramakrishnan | G06F 17/243 715/226 |

\* cited by examiner

```
------------------------------
     McTHAI CO.., LTD.
         TAX ID:3101275568
           VAT INCLUDED
          TAX INVOICE (ABB)
    LOTUS RAMA III    Tel. 0-2681-0971
    POS Serial No:
    POS Type:
    Crev id 6

#ORD
    QTY ITEM                        TOTAL

Take-Out Total (incl Tax)
    Net Total
    TAX INCLUDED
    Cash Tendered
    Change

```
------------------------------
     McTHAI CO.., LTD.
         TAX ID:3101275568
           VAT INCLUDED
          TAX INVOICE (ABB)
    LOTUS RAMA III    Tel. 0-2681-0971
    POS Serial No:03C231209100028
    POS Type:Counter
    Crev id67359 Apiride
              MFY side 1

#ORD3805 -REG 13- 07/07/2012 08:09:15
    QTY ITEM                        TOTAL
      1 Hot Cof 6M 8oz               29.00
      1 DB SausageMuf HBGH           100.00
    Take-Out Total (incl Tax)        129.00
    Net Total                        120.56
    TAX INCLUDED                       8.44
    Cash Tendered                    140.00
    Change                            11.00

DOCUMENT BANKING

LOGIN NAME: ALICE
LAST ACCOUNT ACTIVITY: 03/7/13, 21:00 EST
LOGOUT

| NEW SUBSCRIPTION | DOCUMENT MANAGEMENT | DOCUMENT TRANSACTION | TRANSACTION HISTORY | SUBSCRIPTION MANAGER |

SUBSCRIBED SERVICES

RECEIVED DOCUMENTS

LIVING DOCUMENTS

DETAILED HISTORY

SEARCH CONTENT

ANALYTICS

HELP

SEARCH CONTENT → MOBILE BILL

START DATE: 1/9/2013    END DATE: 1/9/2013

| DD/MM/YY-TIME | NUMBER | DURATION (MIN:SEC) | CHARGES (RS) |
|---|---|---|---|
| STD | | | |
| 12/09/13-09 59 22 | 08586044401 | 2.00 | 1 |
| 12/09/13-17 46 21 | #919718508774 | 1.00 | 0.5 |
| 12/09/13-20 12 31 | 919586044401 | 1.00 | 0.5 |
| 13/09/13-20 42 18 | 918586044401 | 1.00 | 0.5 |
| 14/09/13-20 33 02 | 919455392245 | 7.00 | 3.5 |
| 14/09/13-20 41 39 | #08059645901 | 4.00 | 2 |
| 15/09/13-18 40 39 | 09968381290 | 9.00 | 4.5 |
| 16/09/13-18 11 49 | #010718508774 | 1.00 | 0.5 |
| 16/09/13-20 93 44 | #09891694972 | 7.00 | 3.5 |
| 18/09/13-10 37 46 | 918586044401 | 4.00 | 2 |
| 18/09/13-12 33 51 | 08586044401 | 1.00 | 0.5 |
| 18/09/13-14 10 16 | 08586044401 | 1.00 | 0.5 |
| TOTAL | 64 CALLS | 235.00 | 117.50 |

METHODS AND SYSTEMS FOR HANDLING TRUSTED CONTENT FROM VARIOUS SERVICE PROVIDERS

CROSS-REFERENCE TO RELATED APPLICATION(S)

The present disclosure relates to application Ser. No. 13/969,635, filed 19 Aug. 2013, now US Publication No. 2015-0052047, which is incorporated herein in its entirety by reference.

TECHNICAL FIELD

The disclosed subject matter generally relates to document banking, and more particularly to methods and systems for handling trusted content from various service providers.

BACKGROUND

It is very common to periodically receive documents from various types of service providers, including but not limited to telephone bills, credit card bills, account statements, food receipts, academic transcripts, or similar types of documents. Some of these documents are received on different schedules. For example, some of these documents, such as telephone bills, credit card bills, etc., are received every month, while academic transcripts are received every semester (such as every six months). A user may need to submit some of these documents upon submission of certain types of applications, such as in the case of opening a new bank account, applying for a loan, applying for a job, etc.

However, it may be inconvenient to gather and submit these documents under certain circumstances. For example, a user may need to search the user's email to obtain access to these documents, and then the user may need to print out the documents so that they can be submitted in person, by mail, etc. In addition, the user may need to verify these documents prior to submission. As one example, it may be very inconvenient for a user to gather a large number of receipts, such as receipts from restaurants visited during a business trip, and then to organize or otherwise keep track of these receipts. The above process of gathering and organizing documents can be characterized as cumbersome, inconvenient, and time-consuming. It may therefore be beneficial to provide methods and systems for addressing this issue.

SUMMARY

A method includes authenticating one or more service providers that provide one or more services to users, the one or more service providers being authenticated for sending content to the users via a document banking system. The method further includes receiving one or more templates from the one or more service providers, the one or more templates correspond to the one or more services, the one or more service providers and corresponding templates are registered with the document banking system. Further, the method includes receiving content from a service provider corresponding to a service used by a user, the content is received via secure Application Program Interfaces (APIs), the content being received along with details of the service provider, the service provider having a document bank account with the document banking system, the user having a document bank account with the document banking system. Furthermore, the method includes determining whether the service provider is an authenticated service provider. Based on the determination of whether the service provider is an authenticated service provider, the method includes identifying a template corresponding to the service for which the content is received. Additionally, the method includes overlaying the received content over the identified template, wherein the overlaying is done to generate a document or to update a document with the content received from the service provider. The method also includes adding the generated document or the updated document to the document bank account of the user.

A system for handling content for a service, the system includes a content handler that is configured for: authenticating one or more service providers that provide one or more services to users, the one or more service providers being authenticated for sending content to the users via a document banking system; receiving one or more templates from the one or more service providers, the one or more templates correspond to the one or more services, the one or more service providers and corresponding templates are registered with the document banking system; receiving content from a service provider corresponding to a service used by a user, the content is received via secure Application Program Interfaces (APIs), the content being received along with details of the service provider, the service provider having a document bank account with the document banking system, the user having a document bank account with the document banking system; determining whether the service provider is an authenticated service provider; based on the determination of whether the service provider is an authenticated service provider, identifying a template corresponding to the service for which the content is received; overlaying the received content over the identified template, wherein overlaying is performed to generate a document or to update a document with the content received from the service provider; and adding the generated document or the updated document to the document bank account of the user.

A system includes a service provider device that is configured for: sending a request to a document banking system, for sending content to users via the document banking system; sending one or more templates to the document banking system for each of services, the one or more service providers and corresponding templates are registered with the document banking system; and sending content to the document banking system corresponding to a service along with details of the service provider via secure Application Program Interfaces (APIs). The system further includes a content handler configured for: authenticating the service provider for sending content to the users via the document banking system; receiving the one or more templates from the service provider for each of the services; receiving content from the service provider corresponding to a service used by a user, the content is received via secure Application Program Interfaces (APIs), the content being received along with details of the service provider, the service provider having a document bank account with the document banking system, the user having a document bank account with the document banking system; determining whether the service provider is an authenticated service provider; based on the determination of whether the service provider is an authenticated service provider, identifying a template corresponding to the service for which the content is received; overlaying the received content over the identified template to generate a document or to update a document with the content received from the service provider; and adding the generated document or the updated document to the document bank account of the user. The system also includes a user for: sending a request to receive one or more documents corresponding to one or more services, via the document banking system; and performing transaction on the generated or the updated document.

DETAILED DESCRIPTION

The following detailed description is provided with reference to the figures. Exemplary, and in some cases preferred, embodiments are described to illustrate the disclosure, not to limit its scope, which is defined by the claims. Those of ordinary skill in the art will recognize a number of equivalent variations in the description that follows.

DEFINITIONS

Definitions of one or more terms that will be used in this disclosure are described below without limitations. For a person skilled in the art, it is understood that the definitions are provided just for the sake of clarity, and are intended to include more examples than just provided below.

The term "document banking" relates to handling of one or more documents, such as storing documents, transferring documents, sharing documents, downloading documents or the like, without any limitations.

The term, "document" refers to any document, such as an electronic document without limitations. Further, the "document" may be a document having a single page or multiple pages, each page including text, images, or a combination thereof.

The phrase "document banking system" refers to any system capable of handling activities related to documents such as storing documents, transferring documents, receiving documents, handling billing and payment related activities, verifying documents, or the like. Significant to the present disclosure, the "document banking system" includes a module, for example, a "content handler" for handling trusted content from various service providers.

A "service provider" includes any organization providing services to users such as mobile phone companies, banks, hotels, restaurants, institutes, visa organization, passport organization, universities, or so forth. Various examples of services are, but not limited to, voice and data services, food, visa services, or the like.

A "document bank account" is a document account between a user, and the "document banking system". The "document bank account" includes one or more documents related to the user.

A "user" may be any individual or an entity that has a "document bank account" with the "document banking system". For example, if a "service provider" has a "document bank account" with the "document banking system", the "service provider" is considered to be a user of the "document banking system". In another example, an individual who has a "document bank account" with the "document banking system" is also a user of the "document banking system". For simplicity, the user can be referred to as an individual, without any limitations. Here, the "user" and the "service provider" maintain a "document bank account" with the "document banking system".

"Content" includes any details, information related to a service that a service provider provides to a user. For example, the "content" can include phone bill details such as amount, month, call details, due date, etc.

Additionally, "template" refers to a format, which is used by a service provider for a particular service and these templates vary from service to service and from service provider to service provider.

Overview:

The present disclosure discloses methods and systems for handling content from various service providers, the service providers are authenticated service providers. Examples of various service providers include utility service providers, restaurants, Universities, or the like. Each of these service providers provides various services to users. For example, the utility service provider may provider voice services to the users, while the restaurant service provider may provide food services to the users. In particular, the disclosure discloses a content handler for handling content received from various service providers. The content handler receives content from these service providers, and automatically generates documents or update documents based on the content received from these service providers. The documents generated or updated by the content handler are then added to a document account of a user. Once added, the user can directly transact those documents for various application procedures, such as loans, mortgages, etc. Since these documents are received from the authenticated service providers, thus, the content received from these service providers is trusted. Therefore, the present disclosure eliminates the need of verifying the documents containing the content received from the service providers.

Figure 1:
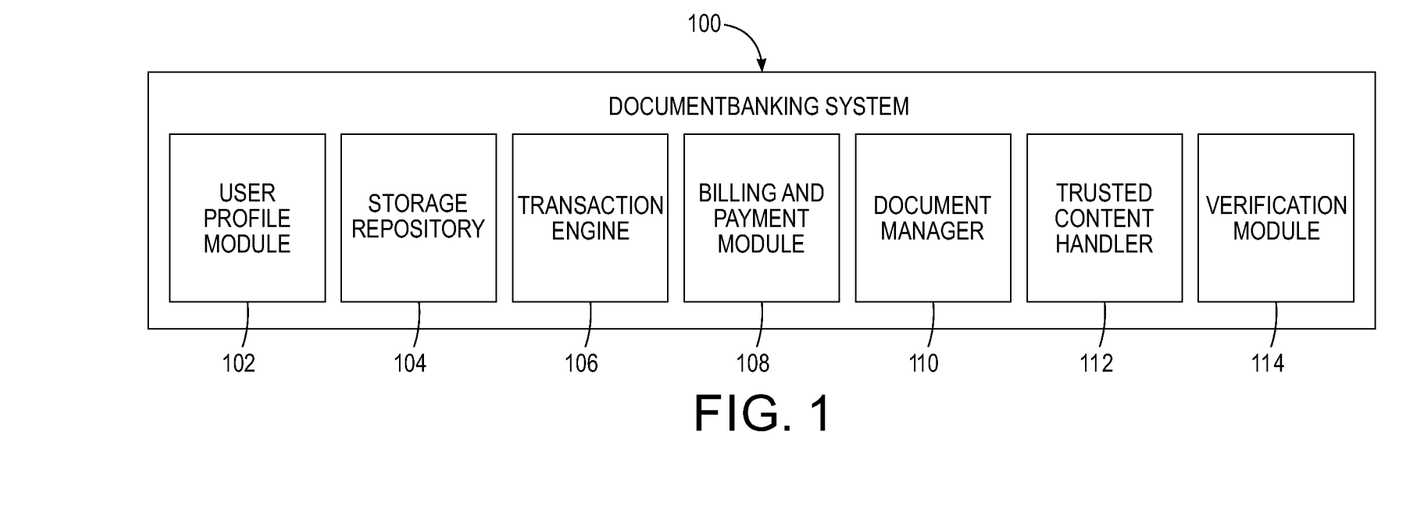
FIG. 1 is a schematic of an exemplary document banking system, in which various embodiments of the disclosure may be practiced.

Exemplary Document Banking System:

FIG. 1 illustrates an exemplary document banking system 100 capable of handling content from various service providers. Embodiments are intended to be used with any type of content, including but not limited to utility bills, academic transcripts, restaurant bills, etc. The document banking system 100 includes a number of modules, such as a user profile module 102, a storage repository 104, a transaction engine 106, a billing and payment module 108, a document manager 110, a trusted content handler 112, and a verification module 114. Each of these modules communicates with each other via suitable protocols, a communication bus, etc.

The user profile module 102 stores information associated with a user. Examples of such user information include, but are not limited to, login credentials (i.e., username, user id, password, etc.), preferences of the user, residential details, contact number(s), email id, etc. The user profile module 102 also stores information related to various services subscribed or used by the user. For example, the user subscribes to voice and data services of a service provider XYZ, or uses food services of a restaurant ABC, or the like. The storage repository 104 maintains or stores documents deposited by the user, such as a driving license, PAN card, utility bills, passport, etc., at the time of opening a document bank account. The documents can be stored in any desired format, such as printable document format (PDF), image format, or any other suitable electronic format(s). In the context of the present disclosure, the storage repository 104 stores documents generated or updated by the content handler module 112, which will be discussed below in more detail.

The transaction engine 106 performs any transaction related to documents, such as sending documents, receiving documents, transferring documents, or the like. The transaction engine 106 transacts the documents upon receiving a request from the user. The billing and payment module 108 manages billing and payment related activities related to the document transaction(s) performed by the transaction engine 106. The verification module 114 facilitates verification of the documents deposited by the user at the time of opening a document bank account, or a subsequent receipt of a user's request. In some embodiments, the verification can be performed manually or via third party interfaces. Additionally, the document banking system 100 can include a Secure Data Technologies (SDT) module (although not shown) that uses one or more known technologies in art, for example, encryption, to authenticate documents and store them in an encrypted form. Each of these modules and associated functionalities are merely exemplary in nature, and one of ordinary skill in the art will understand that the document banking system 100 can include more or less modules to perform the intended operation.

In context of the present disclosure, the content handler 112 is configured for handling content received from various service providers. The content handler 112 receives content from service providers such as utility bill providers, academic transcripts, or the like, for a particular service. In some embodiments, the content is received from a service provider, based on a request from the user. For example, when the user requests a document such as a food receipt from the document banking system 100; the banking system 100 further sends this request to corresponding restaurant for the food receipt, and the restaurant sends content to the document banking system 100. In some embodiments, the content is received automatically from a service provider when it is available or after a pre-defined time. For example, a telephone bill is available on a monthly basis, the service provider transmits content to the document banking system 100 every month. Upon receiving the desired content from the service provider, the content handler 112 identifies a template corresponding to a service of the service provider. Once identified, the content handler 112 overlays the received content over the identified template to generate a document or to update a document. Thereafter, the content handler 112 adds the generated document or the updated document to a document bank account of the user.

In some embodiments, the document banking system 100 can be hosted on a server. In other embodiments, the document banking system 100 can be implemented in the form of hardware, software, or a combination of thereof.

Figure 2:
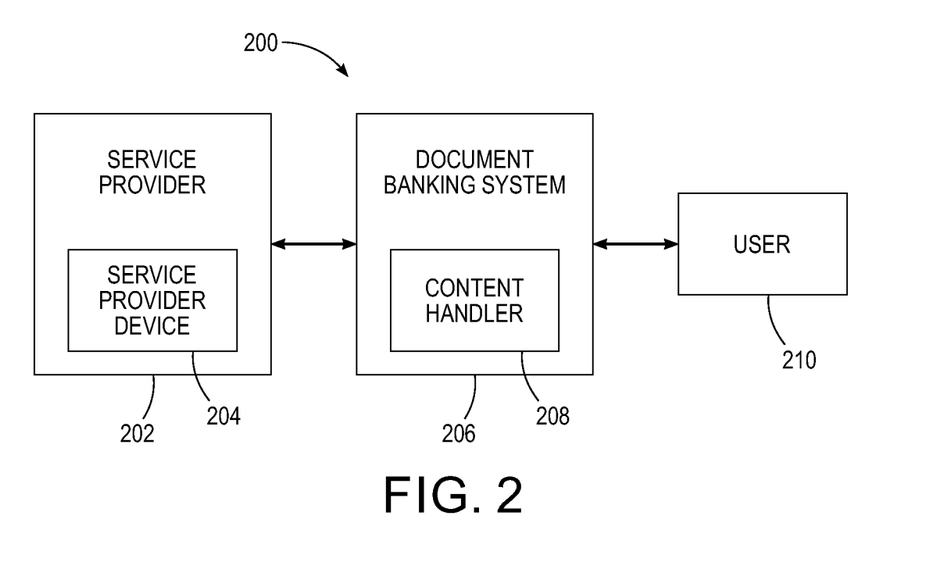
FIG. 2 is a schematic of an overall system, according to an exemplary embodiment of the present disclosure.

Exemplary Overall System:

FIG. 2 illustrates an exemplary overall system 200 for handling content from service providers. As shown in FIG. 2, the system 200 includes or otherwise involves a service provider 202 having a service provider device 204, a document banking system 206 including a content handler 208, and a user 210. The service provider device 204 communicates with the document banking system 206 or the content handler 208 via known communication techniques or any later developed technology.

Initially, the service provider 202 opens a document bank account with the document banking system 206 by registering with the document banking system 206. While registering, the service provider 202 registers one or more templates with the system 206. For example, if the service provider 202 is a utility service provider, the service provider 202 registers utility bill templates with the system 206. Once the document account is established, the service provider 202 can send/or receive content as well as document to/from any party. While registering, the document banking system 206 validates identity of the service provider 202, and thus, the service provider 202 is considered as an authenticated service provider. As a result, the content transmits by the service provider 202 to any user (via the document banking system 206) is trusted content, and this eliminates the need of verifying the content/or a document containing that content received from the service provider 202.

In a similar manner, the user 210 registers himself or herself with the document banking system 206. Once registered, the user 210 can send/or receive document to/from any other party. While registering, the document banking system 206 validates identity of the user 210, thus, the user 210 is also an authenticated user. Further, the user 210 can add other users to whom the user 210 wishes to send content or document via the document banking system 206. In a similar manner, the user 210 can add users from whom the user 210 wishes to receive content or document via the document banking system 206. For example, the user 210 can add a service provider to his document bank account, for receiving document/content on a frequent basis. In other embodiments, the user 210 can still receive content from service providers, which are not added to the document bank account of the user 210. To this end, the present disclosure provides a document bank card to the user 210 for receiving content from such service providers.

To add a service provider, the user 210 initiates a request to the document banking system 206 for receiving content from a service provider such as a utility bill provider, University, or the like. Here, the user 210 initiates this request by logging into her document bank account and authorizes the service provider 202 as a pre-approved sender for her document account. As a part of the authorization, the user 210 inputs his or her service provider ID and contact details such as mobile phone number, email address, or the like to the document banking system 206. The document banking system 206 validates these details by sending a code to the user mobile phone and the user 210 is required to input that code to the document banking system 206. Upon successful validation, the document banking system 206 sends a registration request to the service provider device 204. The request includes information such as user name, his service provider ID, and contact details as verified by the document banking system 206. The service provider device 204 checks for the received details. In case the service provider device 204 finds corresponding match in its database, it accepts the registration request. Thus, the service provider 202 is considered as pre-approved sender and such providers are authorized to send content to the user 210.

In other embodiments, the user 210 can receive content even from service providers, which are not added to his or her document bank account. In such scenarios, the user 210 can use a document banking card to authorize such service providers for receiving content on one time basis or when desired by the user 210. More details of this embodiment will be discussed below.

In the context of FIG. 2, the service provider device 204 sends content to the document banking system 206 or the content handler 208. Along with this, the service provider device 204 sends service provider identity, service details, or any additional details. For example, the service provider device 204 sends bill details for a service along with identity such as 123456. Upon receiving the content, the document banking system 206 checks the details received and then identifies a template corresponding to the service for which the content is received. Once identified, the document banking system 206 overlays the received content over the identified template in order to generate a document or update a document. Once the document is generated or updated, the document banking system 206 adds the document to the document banking account of the user 210. In some embodiments, the document banking system 206 generates a notification when the document is generated or updated. Thereafter, the user 210 can use this document for any purpose. For example, the user 210 can directly submit these documents to any organization such as visa organization, without requiring the document to be re-verified. Additionally, the user 210 can directly send this document to any other user (for example, visa organization) through his document banking account, and this eliminates the need to print the document for submission.

Figure 3:
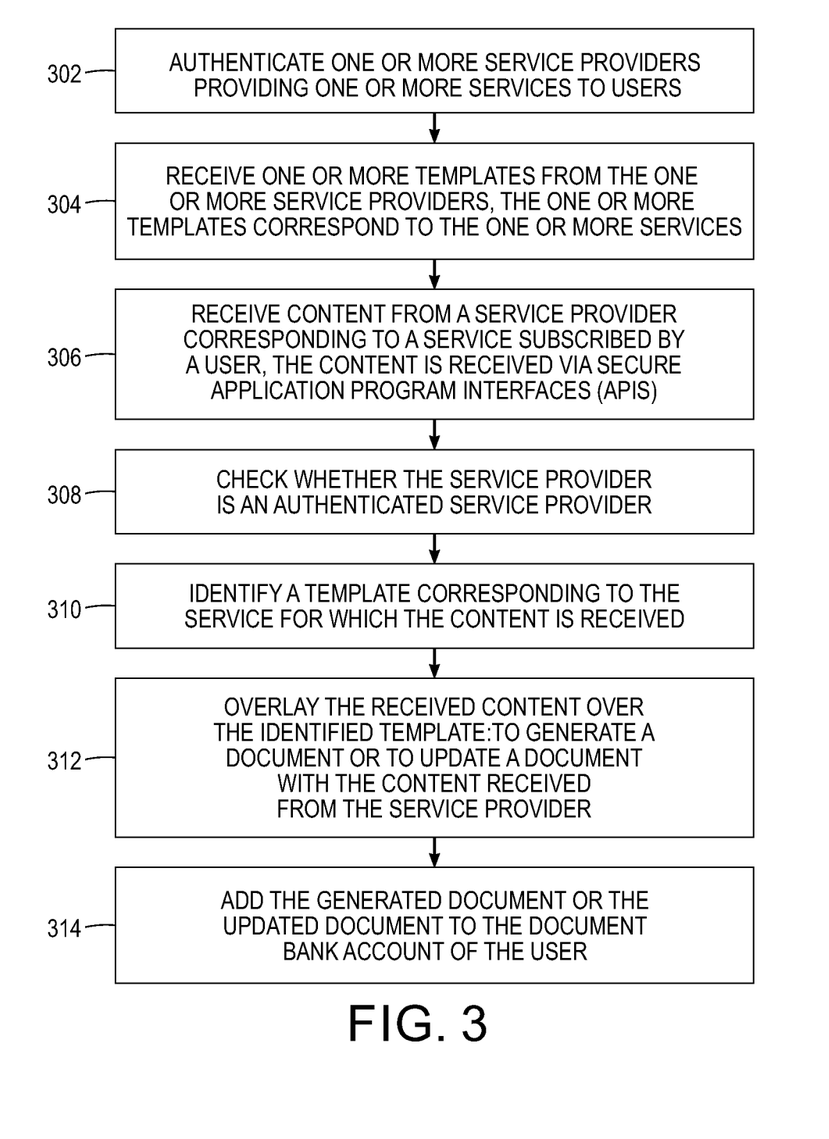
FIG. 3 is a flowchart for handling trusted content from service providers.

Exemplary Method Flowchart:

FIG. 3 illustrates a method for handling content from various service providers, in accordance with an embodiment of the disclosure. The service provider registers itself with the document banking system along with its templates. In particular, the service provider registers with the document banking system in order to send required content to user via the document banking system. In a similar manner, the user registers himself with the document banking system to receive content/document from various service providers into his document bank account. A user can add a service provider to his account if he or she receives content from service providers on a frequent basis (bills from utility companies, transcripts from Universities) and the added service provider is pre-approved sender for the user. In some cases, the user may not approve any preferred sender (i.e., a restaurant service provider) to send document to the user in order to avoid spam.

The method includes receiving a request from a service provider to send content to users via a document banking system. Upon receiving the request, the document banking system checks details of the service provider and accordingly, authenticates the service provider to send content to the users at 302. The service provider provides various services to the users. Thereafter, the document banking system receives one or more templates from the service provider at 304. The templates correspond to one or more services that the service provider provides to the user. For example, a template for a service A may be different from a template for a service B. In some embodiments, the templates may vary from a service provider to service provider. For example, a template of ABC provider for voice services may be different from a template of XYZ provider for the same service (i.e., voice services). Along with the templates, the document banking system also receives one or more rules from the services provider. In some embodiments, the rules may be, but not limited to, for usage about the templates.

The document banking system receives content from the service provider device corresponding to a service subscribed or utilized by a user at 306. The content is sent via secure APIs. Along with this, the service provider device sends service provider identity and service details for which the content is received. The content is received from the service provider device after a pre-defined time period. For example, content related to telephone bill is received every month. In other embodiments, the content is received from the service provider device, upon receiving a request for a document from the user. For example, the user can request for food receipts. Based on the details received, the document banking system checks for the service provider identity and corresponding service and then at 308 determines whether the service provider is an authenticated service provider. In particular, the document banking system checks whether the service provider identity matches with information stored in its database, and if the details match, the document banking system proceeds forward. Based on that, the document banking system identifies a template corresponding to the service for which the content is received at 310. For example, if the content for the telephone bill is received from a service provider such as AT&T, the document banking system identifies a template corresponding to this service. Post identification, the document banking system overlays the received content over the identified template to generate or update a document at 312.

In some embodiments, the document banking system generates a new document if the content changes every month for a service such as telephone bill. But in some embodiments, the document banking system updates a document if the content is updated after a pre-defined time interval. For example, in case of academic transcript, the document banking system updates a document with previously included content. Finally, the document is added to the document bank account of the user at 314. The document system notifies the user when the document is added to the document bank account of the user.

In some embodiments, the method includes storing templates, service provider details, etc., in a storage repository. The storage repository also stores the document generated or updated by the document banking system. In some embodiments, the generated document or the updated document are tagged as verified document by the document banking system.

In some embodiments, the document banking system handles billing and payment related activities associated with transaction of the document. Each time when the user transacts the document, the billing and payment module handles bill associated with those transactions.

In cases where the sender is not a pre-approved user, the present disclosure allows the user to receive content from such service providers. In such scenarios, the user with provided with a document banking card. When the user uses the document bank card with a service provider device such 204, the service provider device receives an approval from the user to send desired content one time. In addition, the document bank details are transmitted to the device 204. Using those details, the service provider device 204 sends content to the user via the document banking system. More particularly, the document account number of the user is transmitted to the service provider device, which then pushes content to the document banking system.

In some embodiments, the user can create rules for an event. Based on the user created event rules, the document banking system performs certain actions automatically. For example, the user creates a rule: "notify for a bill payment when a due date approaches", accordingly, the document banking system notifies the user about the same.

In some embodiments, the document banking system allows the user to run queries on the content received from the service provider. For example, the user can input a query, what is the total number of calls from Sep. 1 to Sep. 9, 2013. The document banking system performs analytics and provides results to the user as depicted by snapshot 410 of FIG. 4E.

The present disclosure is applicable for service providers who subscribe to content handler service of the document banking system to send documents to users. In a similar manner, the present disclosure is applicable for users, who subscribe to content handler service of the document banking system. In other words, the present disclosure is applicable, where the user wishes to send or receive all documents via the document banking system.

Case Scenario 1:

This scenario relates to restaurant receipts handling. The service provider is a restaurant that serves many customers at a central location and desires to simplify the process of handling restaurant receipts, and to reduce or minimize the use of printed receipts to be environment friendly. Thus, the restaurant subscribes to a content handler service of the document banking system. In a similar manner, the user has been finding difficulty in keeping a track of printed receipts, thus, subscribes to a content handler service of the document banking system in order to receive all restaurant receipts into his document bank account.

Figure 4A:
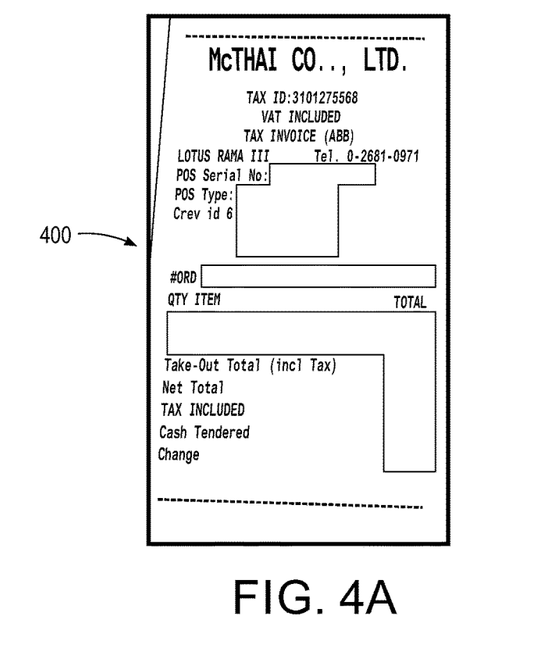
FIGS. 4A-4I are screenshots illustrating exemplary templates and documents after content is overlaid over these templates.
Figure 4B:
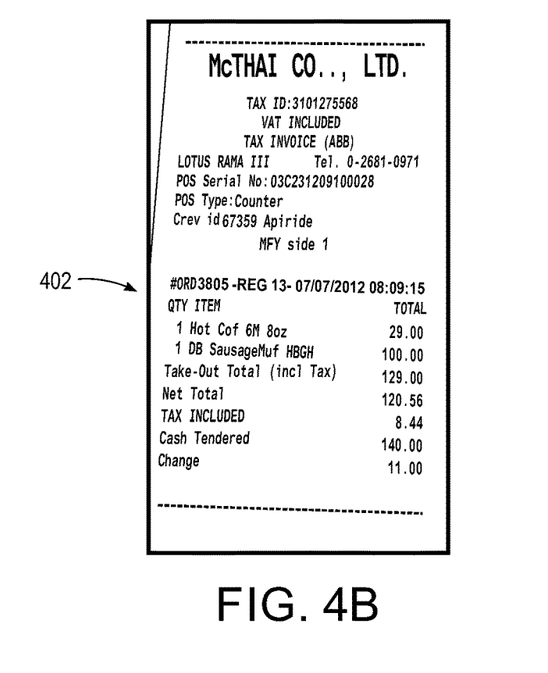

In this scenario, it is assumed that the user wishes to receive a restaurant receipt via a document banking system instead of a printed receipt. Also, the service provider is not a pre-approved user, and therefore the user uses his document card to authorize the restaurant to send content. Here, the user swipes his card at a device provided to him. Upon swiping, the document account number of the user is transmitted to the restaurant system, which pushes the content of his restaurant receipt to the document account of the user using secure APIs. Upon receiving, the document banking system fetches appropriate template registered by the restaurant and then overlays the content on the template to generate a new document i.e., a receipt. Finally, the new document is submitted to the document account of the user. FIG. 4A shows an exemplary template 400 registered by the restaurant McTHAI with the document banking system. An exemplary snapshot 402 of FIG. 4B shows the receipt generated after the content is overlaid over the template.

Figure 4C:
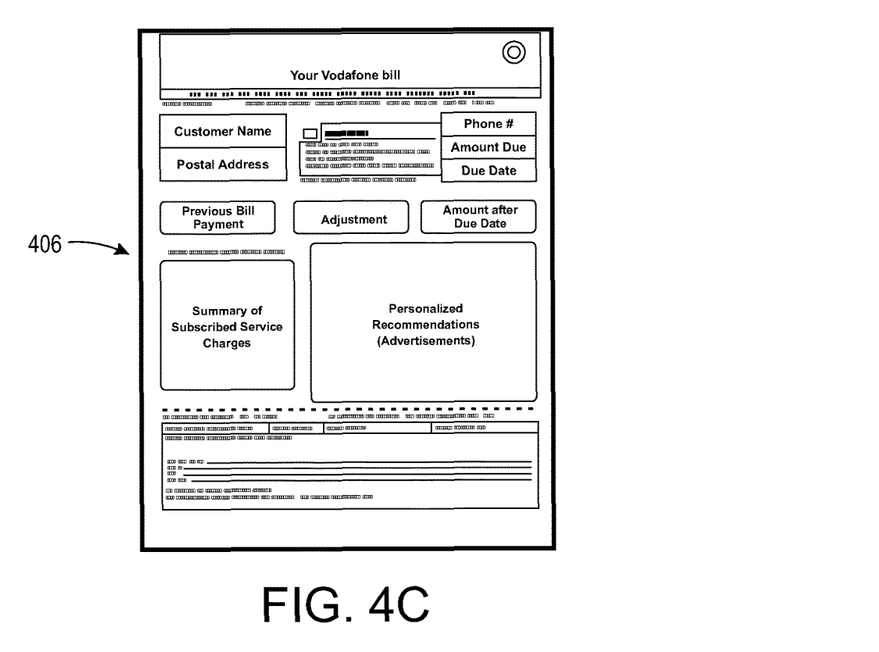

Case Scenario 2:

This scenario relates to handling of phone bills. The service provider is a mobile operator who provides voice and data services to many customers, and wishes to simplify the process of sending bills with the help of the document banking system, and to reduce or minimize the use of printed bills. Thus, the mobile operator subscribes to a content handler service of the document banking system. In a similar manner, the user has been finding difficulty in keeping a track of printed mobile bills, thus, subscribes to a content handler service of the document banking system in order to receive all bills into his document bank account. An exemplary snapshot 406 of templates registered by the mobile operator is shown in FIG. 4C.

Figure 4D:
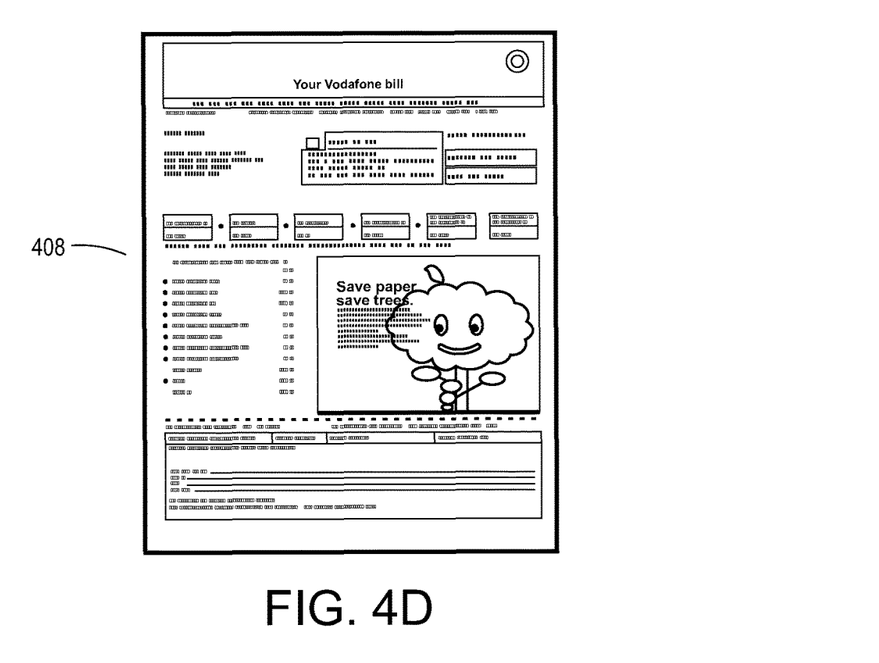
Figure 4E:
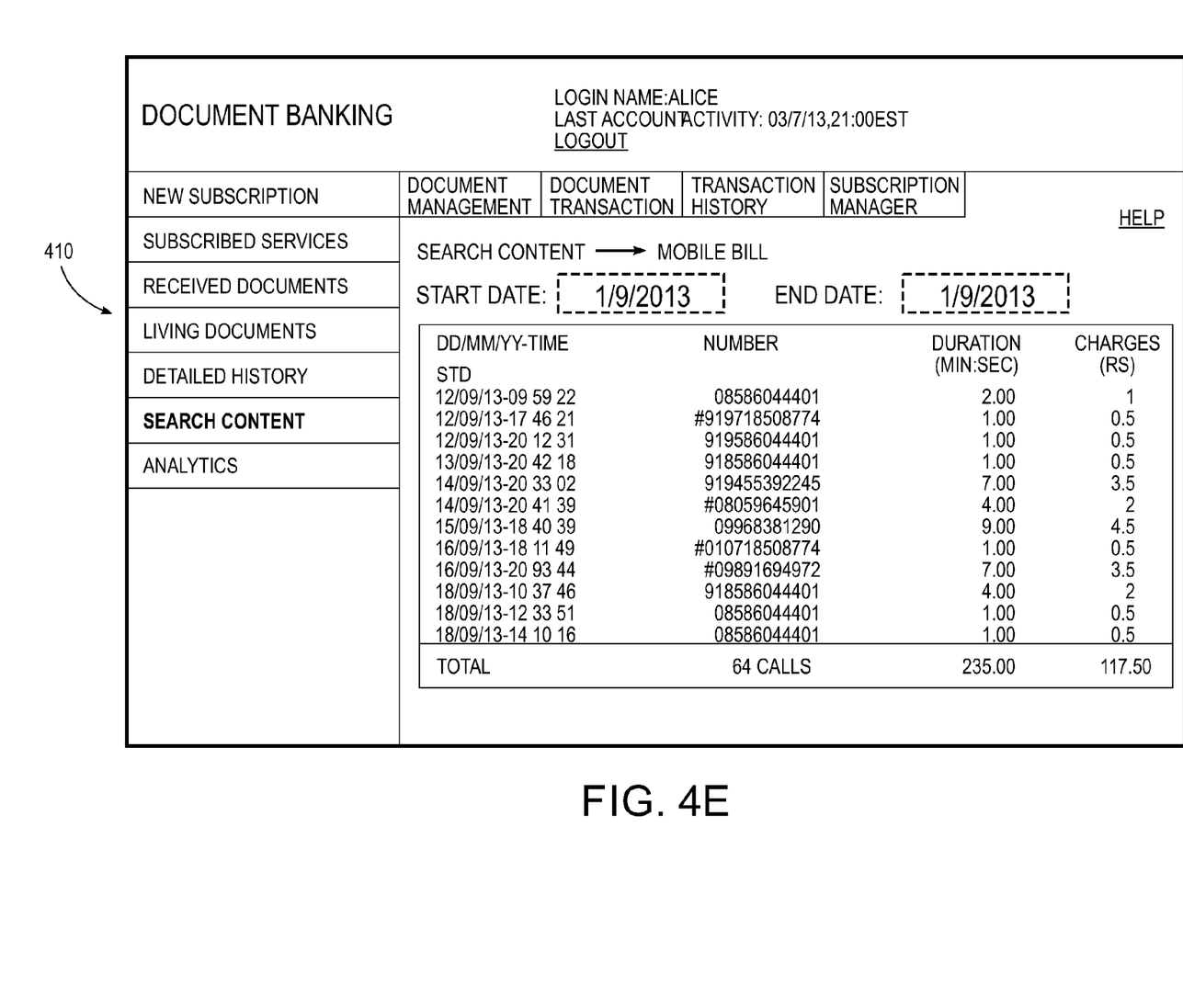

Each time a bill is generated for a user, the mobile operator sends content to the document banking system using secure APIs. For a person skilled in the art, it is understood that APIs are known in the art and thus, can be utilized accordingly. The document banking system retrieves the content sent by the mobile operator and then overlays the content over the identified template and generates a document. Finally, the document is submitted into the document account of the user. The resulted document 408 after overlaying the received content is shown here FIG. 4D.

Figure 4F:
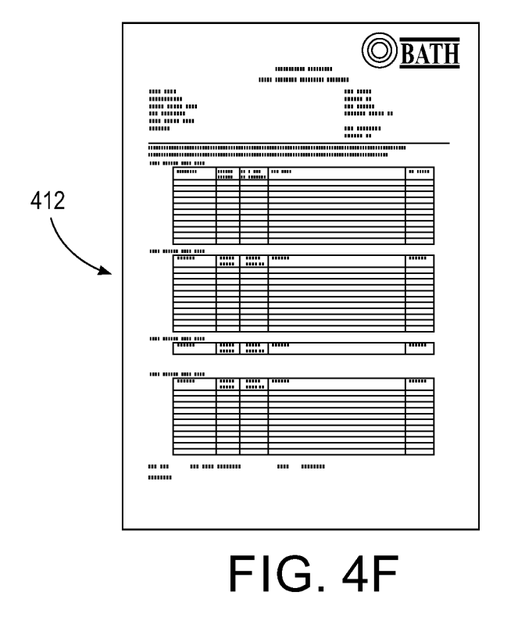

Case Scenario 3:

This case scenario relates to handling academic transcripts. The service provider is a University that offers a number of courses to students. The service provider wishes to simplify the process of handling academic transcripts with the help of a document banking system. In order to do so, the University opens a document bank account with the document banking system and registers its templates (see 412 of FIG. 4F) with the document banking system. In a similar manner, the user opens a document bank account with the document banking system for receiving academic transcripts.

Figure 4G:
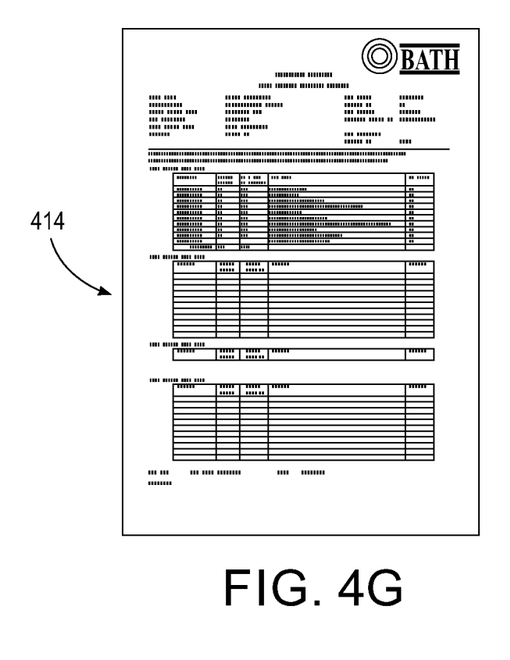
Figure 4H:
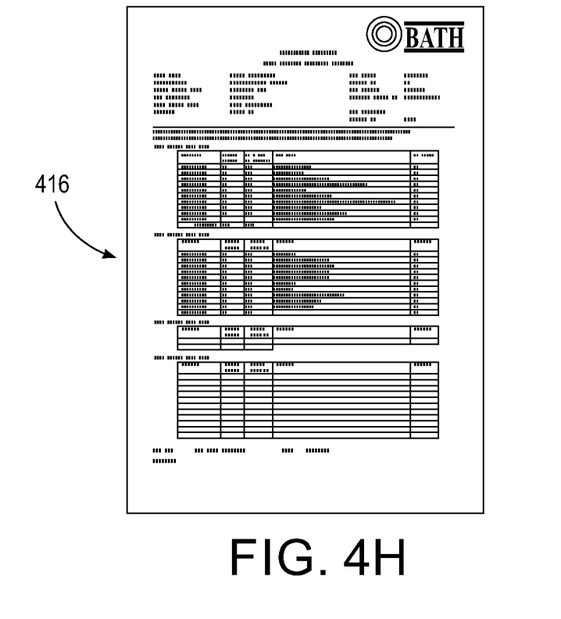
Figure 4I:
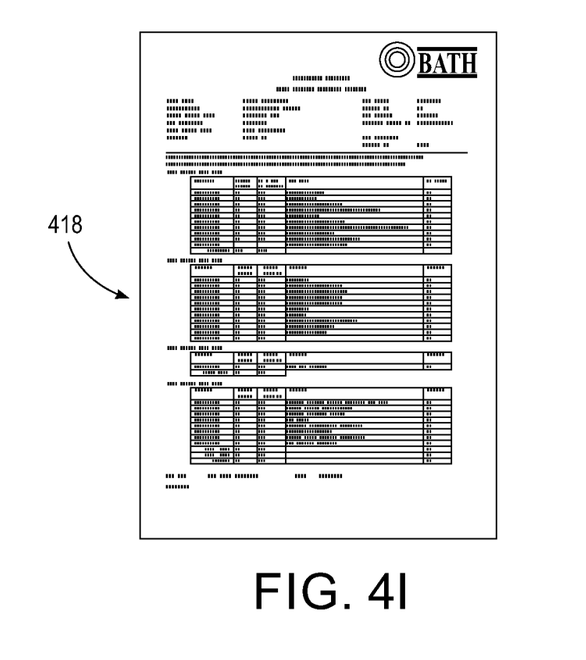

At the end of each semester, the University sends content to the document banking system. The document banking system identifies a template corresponding to the received content and overlays the received content over the identified template. Finally, the document is submitted to the document bank account of the user. The user can now freely use this document for all official purpose such as Job/Internship. An exemplary snapshot 414 of the document generated after overlaying content is shown in FIG. 4G. At the end of each semester, the University sends content to the document banking system, and the document banking system appends the content over the previous version of the document banking system. In this manner, the document banking system updates the document and such updated documents are shown as 416, and 418 of FIGS. 4H and 4I, respectively.

The present disclosure discloses methods and systems for receiving trusted content from service providers. The disclosed systems eliminate the need of verifying content or a document containing the content as the content is received directly by an authenticated service provider. The disclosure further eliminates the need to print documents for verification purpose, thereby making it a green idea. The disclosure allows the user to receive content from pre-approved service provider as well as others. Further, the present disclosure improves user experience/convenience by allowing them to easily access trusted content/document via a document banking account. As all the documents are maintained with the document bank account of the user, the user does not have to worry about keep a track of multiple documents, which reduces inconvenience to the user.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method, comprising:
   in response to a user swiping a document card at a device of a service provider, authenticating, by a server hosting a document banking system, the service provider on a one-time basis for sending content to the user via the document banking system, wherein the authenticating comprises transmitting a document account number associated with the user to the device of the service provider;
   receiving, by the server, content from the device of the service provider corresponding to a service used by the user, the content being received via secure Application Program Interfaces (APIs), the content being received along with details of the service provider, the user having a document bank account with the document banking system;
   identifying, by the server, a template corresponding to the service for which the content is received, wherein the template is stored in a storage repository associated with the document bank account;

overlaying, by the server, the received content over the identified template to generate or to update an electronic document with the content received from the service provider;

adding the generated or updated electronic document to the storage repository associated with the document bank account of the user; and displaying the generated or updated electronic document on a user interface.

2. The method of claim 1, further comprising receiving a request from the user to receive the content from the service provider via the document banking system.

3. The method of claim 1, further comprising receiving a request from the service provider to send content to corresponding users via the document banking system.

4. The method of claim 1, further comprising receiving one or more rules from the service provider along with the template.

5. The method of claim 1, wherein the content is received from the service provider after a pre-defined time period.

6. The method of claim 1, wherein the content is received from the service provider, upon receiving a request from the user for a document.

7. The method of claim 1, wherein the content received from the service provider is trusted.

8. The method of claim 1, wherein the generated or updated electronic document is used by the user for any type of transaction, without requiring the generated or updated electronic document to be verified.

9. The method of claim 1, further comprising storing the generated or updated electronic document in a storage repository.

10. The method of claim 1, further comprising performing analytics on the content received from the service provider.

11. The method of claim 1, further comprising generating a notification for the user when the generated or updated electronic document is added to the document bank account of the user.

12. The method of claim 1, further comprising tagging the generated or updated electronic document as a verified document.

13. The method of claim 1, further comprising handling billing and payment related activities.

14. The method of claim 1, further comprising allowing the user to run one or more queries on the content received from the service provider.

15. A system for handling content for a service, the system comprising:

a service provider device associated with a service provider, the service provider device configured for receiving a document account number associated with a user of a document banking system hosted on a server in communication with the service provider device, wherein the document account number is received upon the user swiping a document card at the service provider device;

a content handler hosted on the server, the content handler being configured for:

authenticating, on a one-time basis, the service provider for sending content to the user via the document banking system, wherein the authenticating is based on receiving the document account number from the service provider device;

receiving content from the service provider device corresponding to a service used by the user, the content being received via secure Application Program Interfaces (APIs), the content being received along with details of the service provider, the user having a document bank account with the document banking system;

identifying a template corresponding to the service for which the content is received, wherein the template is stored in a storage module associated with the document bank account;

overlaying the received content over the identified template to generate or to update an electronic document with the content received from the service provider;

adding the generated or updated electronic document to the storage module associated with the document bank account of the user; and displaying the generated or updated electronic document on a user interface.

16. The system of claim 15, further comprising a billing and payment module stored in the server for handling billing and payment related activities.

17. The system of claim 15, wherein the storage module is further for storing rules received from the service provider, and the details associated with the service providers.

18. The system of claim 15, further comprising a transaction engine for transacting the generated or updated electronic document.

19. A system, comprising:

a service provider device associated with a service provider, the service provider device being configured for:

receiving a document account number associated with a user of a document banking system hosted on a server in communication with the service provider device, wherein the document account number is received upon the user swiping a document card at the service provider device; and sending content to the document banking system corresponding to a service along with details of the service provider via secure Application Program Interfaces (APIs);

a content handler hosted on the server, the content handler being configured for:

authenticating, on a one-time basis, the service provider for sending the content to the user via the document banking system, wherein the authenticating is based on receiving the document account number from the service provider device;

receiving the content from the service provider corresponding to a service used by the user, the content being received via secure Application Program Interfaces (APIs), the content being received along with details of the service provider, the user having a document bank account with the document banking system;

identifying a template corresponding to the service for which the content is received, wherein the template is stored in a storage module associated with the document bank account;

overlaying the received content over the identified template to generate or to update an electronic document with the content received from the service provider;

adding the generated or updated electronic document to the storage module associated with the document bank account of the user; and a user interface hosted on the server, the user interface being configured for:

displaying the generated or updated electronic document.

20. The system of claim 19, wherein the content handler is configured for authenticating the user for receiving the content from the service provider via the document banking system.

21. The system of claim 19, wherein the storage module is further for storing the template in a pre-defined format, rules received from the service provider, details associated with the service provider, and the generated document or updated electronic document.

22. The system of claim 19, wherein the document banking system includes a billing and payment module for handling billing and payment related activities.

23. The system of claim 19, wherein the document banking system includes a transaction engine for transacting the generated or updated electronic document.

* * * * *